United States Patent Office 3,482,855
Patented Dec. 9, 1969

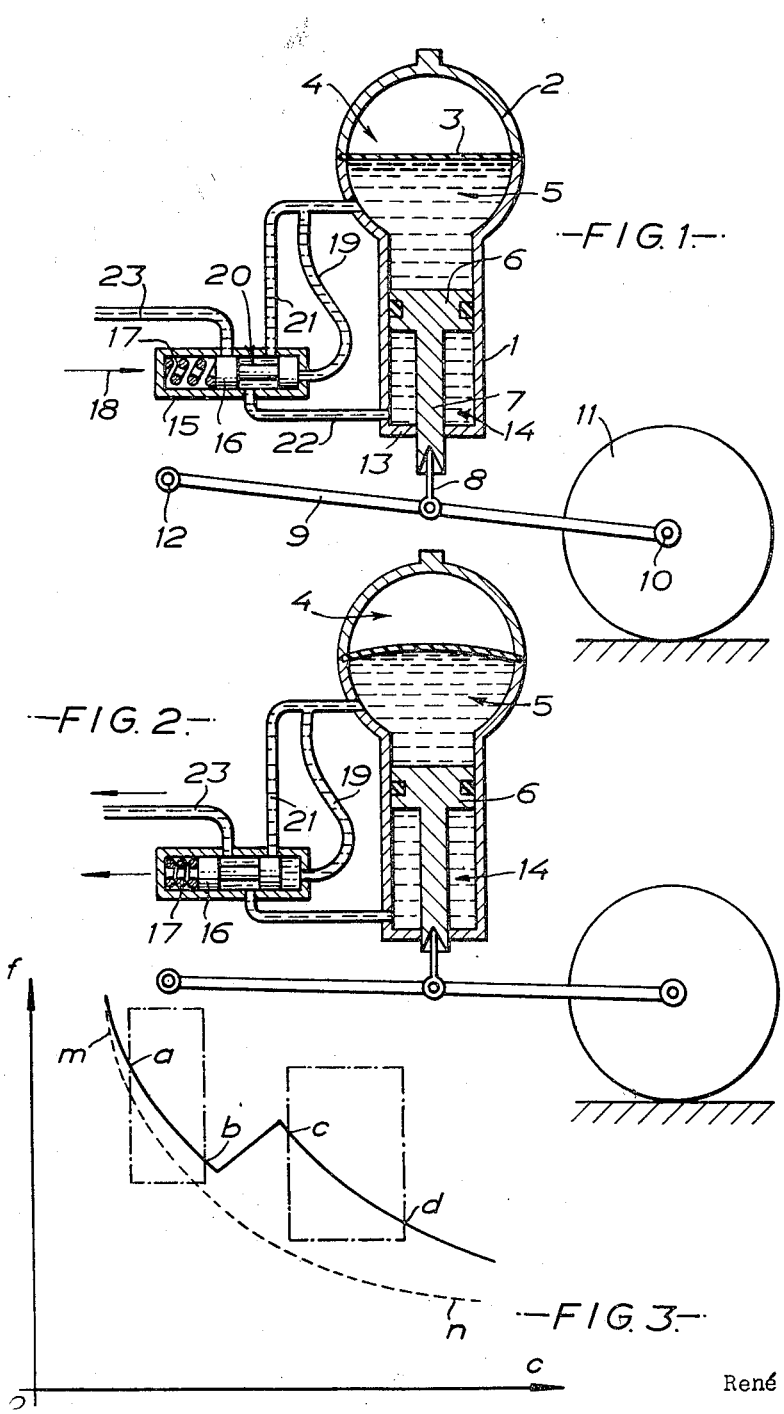

3,482,855
HYDROPNEUMATIC SUSPENSION
René Capgras, 51 Rue du Rocher, Paris 1, France
Filed Mar. 27, 1968, Ser. No. 716,508
Int. Cl. B60g 9/04, 11/30; F16f 5/00
U.S. Cl. 280—124
1 Claim

ABSTRACT OF THE DISCLOSURE

A hydropneumatic suspension for a vehicle has a sealed chamber which is divided by a membrane into a gaseous cushion and a liquid chamber. The latter is in communication with a cylinder with a double acting piston connected by a linkage to the road wheel. A passage joins opposite sides of the piston, but within this passage there is a spring loaded valve. When the vehicle is unloaded this valve permits restricted flow of the liquid, but when the vehicle is loaded the pressure above the piston is applied to oppose the spring loading and so move the valve to isolate the liquid above the piston and to connect that below the piston to a reservoir.

---

The present invention concerns improvements in hydropneumatic suspensions of the type used on road vehicles.

Hydropneumatic suspensions are known which comprise a gas cushion, usually of compressed nitrogen, the volume of which is varied in displacing a liquid, very often an oil. It is known that this principle of suspension has advantages in so far as concerns the elimination of suspension noises and the reduction of oscillation in the suspension. On the other hand, the system has a flexibility which varies in accordance with whether the vehicle is running empty or loaded.

The present invention has for its object to avoid these inconveniences by providing a hydropneumatic system of variable flexibility, adapted to provide an adequate suspension whatever the loading of the vehicle.

A hydropneumatic suspension device in accordance with the invention comprises a gaseous cushion in a sealed chamber and separated by a flexible membrane from a liquid adapted to be displaced in accordance with the movements of a piston in a cylinder communicating with the chamber the piston rod being connected to the suspension arm of a wheel of the vehicle characterised in that the cylinder is double acting, with a piston dividing the cylinder into an upper chamber and a lower chamber, both chambers being filled with liquid and communicating by a channel in which a valve is inserted, the valve being biassed by a spring adjusted to a value which provides a suspension force from the upper chamber of the cylinder when the vehicle is empty, with the two chambers in communication, whilst when the vehicle is loaded the pressure of the liquid in the upper chamber displaces the valve, isolates the top chamber and connects the lower chamber with an exhaust.

It is to be understood that with this arrangement, the system functions in the usual manner when the vehicle is loaded and the upper chamber is isolated. On the contrary, if the vehicle is empty, the pressures in the upper and lower chambers are substantially equal.

The ratio between the cross-sections of the piston and its rod, and the rating of the spring of the valve which controls the passage from one state of the device to the other, enables the characteristics of the suspension to be varied to any required extent.

One construction of a suspension device in accordance with the invention will now be described by way of example only, with reference to the accompanying drawings in which:

FIGURE 1 is a schematic view of a suspension device in use on an empty vehicle,

FIGURE 2 is a similar view of the device with a vehicle when it is loaded, and

FIGURE 3 is a characteristic curve of the suspension.

The device in accordance with the invention comprises a cylinder 1 the upper part of which is in communication with a sealed reservoir 2. This latter is separated by a flexible membrane 3, into an upper chamber which encloses a gaseous cushion 4 and a chamber 5 which contains a liquid. The gaseous cushion 4 contains compressed nitrogen. The liquid in the chamber 5 is usually oil which is compressed by a piston 6 sliding in the cylinder 1.

The piston 6 is integral with the rod 7 the lower part of which is connected by a rod 8 to a vehicle suspension arm 9 of known type.

This arm 9 carries at one of its ends a bearing 10 on which rotates a wheel 11 of the vehicle, whilst at its other end it is pivoted by an axle 12 to the chassis of the said vehicle. The wheel 11 rolls on the ground the irregularities of which induce oscillations of the arm 9 and a displacement of the piston 6 in the cylinder 1. The lower part of the cylinder 1 is closed by a cover 13 through which the rod 7 passes via a sealing gland. The cylinder 1 is thus divided into two chambers, the upper, above mentioned, chamber 5 and a lower annular chamber 14 which surrounds the rod 7 below the piston 6.

There is a hollow cylindrical distributor valve 15 inside which slides a shuttle 16. Between this shuttle and the left hand side of the body of the valve 15 there is mounted a compression spring 17 the rating of which is chosen as a function of the considerations which will be explained hereafter. In the example shown, this spring 17 tends to push the shuttle 16 towards the right (as indicated by the arrow 18) where it meets the pressure of the liquid which exists in the upper chamber 5, which is directly connected to the right hand end of the valve 15 by a channel 19 which discharges opposite the right hand end of the shuttle 16. This shuttle has a peripheral throat 20 in its central part. Three channels discharge laterally into the body of the valve 15. These are:

A channel 21 which is connected to the upper chamber 5, as also is the channel 19;

A channel 22 which communicates with the lower chamber 14;

A channel 23 which returns the liquid to a reservoir (not shown).

The openings through which the channels 21, 22 and 23 discharge into the body of the valve 15 are arranged so as to isolate the channel 23 and to establish communication between channels 21 and 22 when the shuttle 16 is moved to the right under the force of the spring 17 (FIGURE 1), whilst the channel 21 is isolated and the channels 22 and 23 connected when the shuttle 16 is pushed to the left under the pressure existing in the channel 19 and in the upper chamber 5 (FIGURE 2).

The device operates as follows:

When the vehicle is empty (FIGURE 1), the pressure of the gaseous cushion is relatively small, as also is that which exists in the liquid of the chamber 5. The spring 17 acts against the pressure of the liquid in the channel 19; the shuttle 16 moves to the right, which establishes communication between the chambers 5 and 14. In this condition, only the transverse section of the rod 7 of the piston affects the flexibility of the suspension during wheel bounce. If reference is made to the diagram shown in FIGURE 3 where there is shown on the abcissa the load C of the vehicle and on the ordinate the deflections $f$ of the suspension, it will be seen that when empty, a flexibility curve corresponding to the arc $a$–$b$ is obtained which, theoretically is a hyperbola.

When the vehicle is loaded (FIGURE 2), the mean pressure of the gaseous cushion 4 and of the liquid in the upper chamber 5 increases, as well as in the liquid in the channel 19. The shuttle 16 is pushed towards the left against the spring 17, and this puts the lower chamber 14 into communication with the mouth of the channel 23. The pressure falls immediately in the lower chamber 14, so that the transverse section of the piston 6 must now be taken into consideration for the calculation of the flexibility of the suspension. This new section corresponds on the diagram of FIGURE 3 to an arc $c-d$ of another hyperbolic curve, the average inclination of which can be chosen in a manner not very different from that of the arc $a-b$.

The points $b-c$ of the diagram are connected by an intermediate part of a curve which corresponds to the transitory phases where the shuttle 16 has only moved part way.

The characteristic of the suspension obtained with a device in accordance with the invention corresponds to a composite curve $a-b\ c-d$ which has a flexibility which varies little with the load of the vehicle, contrary to what is obtained with known hydropneumatic suspensions the flexibility of which is a single hyperbolic arc $m-n$. It is known that such a curve $m-n$ gives a high flexibility when the vehicle is empty and the suspension is much too hard when the vehicle is loaded.

I claim:
1. A hydropneumatic suspension for a vehicle comprising a sealed chamber, a diaphragm in said chamber, a compressed gas on one side of said diaphragm, a liquid on the other side of said diaphragm, a cylinder and double acting piston communicating with said liquid in said chamber, a suspension arm connected to said piston and carrying a road wheel of said vehicle, a spring loaded shuttle valve, and connections from said valve to said cylinder such that for light loads on said vehicle, the parts of the cylinder of both sides of said piston are interconnected, whereas for heavy loads the upper part of said cylinder is isolated and the lower part of said cylinder is connected to exhaust.

References Cited

UNITED STATES PATENTS

| | | | |
|---|---|---|---|
| 3,049,360 | 8/1962 | Allinquant | 280—24 |
| 3,323,810 | 6/1967 | Klein | 267—64 X |
| 3,353,815 | 11/1967 | Henry-Biabaud | 267—64 |

A. HARRY LEVY, Primary Examiner

U.S. Cl. X.R.

267—24, 64